United States Patent
Kasori et al.

(10) Patent No.: US 11,866,648 B2
(45) Date of Patent: Jan. 9, 2024

(54) PROCESS FOR PRODUCING POLYMERIZABLE COMPOSITION FOR OPTICAL MATERIALS

(71) Applicant: MITSUI CHEMICALS, INC., Tokyo (JP)

(72) Inventors: Yuuki Kasori, Omuta (JP); Nobuo Kawato, Kurume (JP)

(73) Assignee: MITSUI CHEMICALS, INC., Tokyo (JP)

( * ) Notice: Subject to any disclaimer, the term of this patent is extended or adjusted under 35 U.S.C. 154(b) by 148 days.

(21) Appl. No.: 17/426,755

(22) PCT Filed: Jan. 29, 2020

(86) PCT No.: PCT/JP2020/003203
§ 371 (c)(1),
(2) Date: Jul. 29, 2021

(87) PCT Pub. No.: WO2020/158813
PCT Pub. Date: Aug. 6, 2020

(65) Prior Publication Data
US 2022/0098473 A1   Mar. 31, 2022

(30) Foreign Application Priority Data
Jan. 30, 2019 (JP) .................... 2019-013922

(51) Int. Cl.
| | | |
|---|---|---|
| G02B 1/04 | (2006.01) | |
| C08G 18/24 | (2006.01) | |
| C09K 9/02 | (2006.01) | |
| C08G 18/38 | (2006.01) | |
| C08G 18/48 | (2006.01) | |
| C08G 18/66 | (2006.01) | |
| C08G 18/75 | (2006.01) | |
| C08K 5/1545 | (2006.01) | |
| C08K 5/521 | (2006.01) | |

(52) U.S. Cl.
CPC .............. C09K 9/02 (2013.01); C08G 18/242 (2013.01); C08G 18/3876 (2013.01); C08G 18/4825 (2013.01); C08G 18/6666 (2013.01); C08G 18/758 (2013.01); C08K 5/1545 (2013.01); C08K 5/521 (2013.01); C09K 2211/1018 (2013.01); G02B 1/041 (2013.01)

(58) Field of Classification Search
CPC .. G02B 1/041; C08G 18/242; C08G 18/3876; C08G 18/4825; C08G 18/6666; C08G 18/758
See application file for complete search history.

(56) References Cited

U.S. PATENT DOCUMENTS

| | | | |
|---|---|---|---|
| 2004/0021133 A1 | 2/2004 | Nagpal et al. | |
| 2006/0014099 A1 | 1/2006 | Faler et al. | |
| 2009/0227745 A1* | 9/2009 | Kohgo | C08G 18/757 |
| | | | 525/453 |
| 2010/0075154 A1* | 3/2010 | Hayashi | C08K 5/36 |
| | | | 428/425.9 |
| 2015/0152322 A1 | 6/2015 | Nakayama et al. | |
| 2015/0177416 A1 | 6/2015 | Ryu | |
| 2017/0002176 A1* | 1/2017 | Kadowaki | C08G 18/6633 |
| 2019/0284324 A1 | 9/2019 | Ribeiro et al. | |

FOREIGN PATENT DOCUMENTS

| | | |
|---|---|---|
| DE | 102009052986 A1 | 5/2010 |
| JP | S64029489 A | 1/1989 |
| JP | H01152182 A | 6/1989 |
| JP | 2008506031 A | 2/2008 |
| WO | 2004011506 A1 | 2/2004 |
| WO | 2014002844 A1 | 1/2014 |
| WO | 2014007154 A1 | 1/2014 |
| WO | 2015115648 A1 | 8/2015 |
| WO | 2018070383 A1 | 4/2018 |

OTHER PUBLICATIONS

Alexandridis et al, "Poly (ethylene oxide)-poly (propylene oxide)-poly(ethylene oxide) block copolymer surfactants in aqueous solutions and at interfaces: thermodynamics, structure, dynamics, and modeling", Colloids and Surfaces A: Physicochem. Eng. Aspects, 96 (1995), pp. 1-46.

Lam et al., "Direct visualization of micelles of Pluronic block copolymers in aqueous solution by cryo-TEM", Phys. Chem. Chem. Phys., 1999, 1, 3331-3334.

* cited by examiner

*Primary Examiner* — Michael L Leonard
(74) *Attorney, Agent, or Firm* — BUCHANAN INGERSOLL & ROONEY PC

(57) ABSTRACT

A process for producing a polymerizable composition for optical materials of the present invention includes a step A of mixing together a polyisocyanate compound (i), a polymer (ii) represented by General Formula (ii), a photochromic compound (iii), and an internal release agent (iv), a step B of mixing a mixed solution obtained by the step A with a polythiol compound (v), and a step C of further mixing a mixed solution obtained by the step B with a polymerization catalyst (vi) so as to obtain a polymerizable composition for optical materials, wherein in the step A, the internal release agent (iv) is added so that a content thereof in the polymerizable composition for optical materials is 500 to 3,000 ppm, and in the step C, the polymerization catalyst (vi) is added so that a content thereof in the polymerizable composition for optical materials is 120 to 500 ppm.

$$R_1[-A_1-R_2-A_2-R_3]_n \quad (ii).$$

13 Claims, No Drawings

PROCESS FOR PRODUCING POLYMERIZABLE COMPOSITION FOR OPTICAL MATERIALS

TECHNICAL FIELD

The present invention relates to a process for producing a polymerizable composition for optical materials.

BACKGROUND ART

Plastic lenses have become rapidly widespread as optical materials such as spectacle lenses and camera lenses that are lightweight, hard to break, and colorable. So far, molded articles for lenses using various plastic materials have been developed and used.

Typical examples thereof include an allyl resin obtained from diethylene glycol bisallyl carbonate and diallyl isophthalate, a (meth)acrylic resin obtained from (meth)acrylate, and a polythiourethane resin obtained from an isocyanate and a thiol.

In recent years, high-performance plastic lenses with various functions have been developed. For example, a lens that blocks light of harmful wavelengths, a lens with anti-scratch surface, and a lens with anti-fog surface suppressing fogging caused by temperature difference are known. A plastic lens with photochromic performance is one of the high-performance plastic lenses, and development thereof is ongoing. In a case where the plastic lens with photochromic performance is used, it is possible to obtain eyeglasses that functions as ordinary transparent eyeglasses indoors and functions as anti-glare eyeglasses protecting eyes outdoors by the lens that turns gray or brown in response to solar light (ultraviolet rays). This is a high-performance eyeglasses that does not need to be replaced indoors or outdoors unlike sunglasses and can be used as both the eyeglasses for indoor use and eyeglasses for outdoor use. In recent years, there has been an increasing demand for this eyeglasses throughout the world.

The plastic lens with photochromic performance is required to exhibit quick coloring and decoloring responsiveness and demonstrate excellent coloring performance.

For example, in a case where a specific aliphatic or alicyclic isocyanate is used, it is possible to obtain a urethane resin-based optical material or a thiourethane resin-based optical material, and a plastic lens containing a photochromic compound without deteriorating the performance of the photochromic compound. (Patent Document 1).

Furthermore, in a case where a polymerizable composition for optical materials containing a specific polyol compound is used, it is possible to obtain a polyurethane-based optical material or a polythiourethane-based optical material containing a photochromic compound that demonstrates excellent photochromic performance and has excellent physical properties such as mechanical strength, without deteriorating the performance of the photochromic compound (Patent Document 2).

A technique has been proposed in which the aggregation of a photochromic compound in a polymerizable composition for optical materials or a resin for optical materials is suppressed and the dispersibility of the photochromic compound is improved so that the photochromic performance of a resin is improved. As such a technique, for example, polymer particles composed of a polymer containing a photochromic compound have been proposed (Patent Documents 3 to 7). In addition, a resin for optical materials has been proposed which has nanoparticles containing a photochromic compound and has a refractive index of 1.595 to 1.695 (Patent Document 8). Furthermore, a polymerizable composition for optical materials that contains a specific polymer, a photochromic compound, and a polymerizable compound and a process for producing the composition have been proposed (Patent Document 9). The document also describes that a molded article obtained from the composition contains polymer particles, and the polymer particles encapsulate a photochromic compound.

RELATED DOCUMENT

Patent Document

[Patent Document 1] International Publication No.
[Patent Document 2] International Publication No. WO2015/115648
[Patent Document 3] International Publication No. WO2014/007154
[Patent Document 4] PCT Japanese Translation Patent Publication No. 2008-506031
[Patent Document 5] Japanese Unexamined Patent Publication No. S64-29489
[Patent Document 6] Japanese Unexamined Patent Publication No. H01-152182
[Patent Document 7] DE102009052986
[Patent Document 8] International Publication No. WO2004/011506
[Patent Document 9] International Publication No. WO2018/070383

Non-Patent Document

[Non-Patent Document 1] P. Alexandridis, T. A. Hatton/ Colloids Surfaces A: Physicochem. Eng. Aspects 96 (1995) 1-46
[Non-Patent Document 2] Phys. Chem. Chem. Phys., 1999, 1, 3331-3334

SUMMARY OF THE INVENTION

Technical Problem

However, in the conventional techniques described in Patent Documents 3 to 9, sometimes white turbidity occurs in the optical material obtained from the polymerizable composition and thus affects transparency, fine aggregates are formed, or optical distortion (striae) occurs. Therefore, the techniques need to be improved.

Solution to Problem

Focusing on the manufacturing conditions of a polymerizable composition, the inventors of the present invention have found that a polymerizable composition for optical materials that is obtained by mixing a specific polymer with a photochromic compound under specific conditions can provide an optical material in which white turbidity, the formation of fine aggregates, and the occurrence of optical distortion is suppressed. Based on the finding, the inventors have accomplished the present invention.

That is, the present invention can be described as below.

[1] A process for producing polymerizable composition for optical materials, including a step A of mixing together a polyisocyanate compound (i), a polymer (ii) represented by General Formula (ii), a photochromic compound (iii), and an internal release agent (iv), a step B of mixing a mixed solution obtained by the step A with a polythiol compound (v), and a step C of further mixing a mixed solution obtained by the step B with a polymerization catalyst (vi) so as to obtain a polymerizable composition for optical materials, wherein in the step A, the internal release agent (iv) is added so that a content of the internal release agent (iv) in the polymerizable composition for optical materials is 500 to 3,000 ppm, and in the step C, the polymerization catalyst (vi) is added so that a content of the polymerization catalyst (vi) in the polymerizable composition for optical materials is 120 to 500 ppm,

$R_1 + A_1 - R_2 - A_2 - R_3]_n$ (ii)

wherein, In General Formula (ii), $A_1$ and $A_2$ represent different polymer chains. $R_1$ is an n-valent organic group, $R_2$ is a linking group that links two kinds of polymer chains, and $R_3$ is an organic group. n is an integer of 1 to 6.

[2] The process for producing a polymerizable composition for optical materials described in [1], wherein in the step A, a time taken for mixing together the polyisocyanate compound (i), the polymer (ii), the photochromic compound (iii), and the internal release agent (iv) is 2 hours or less.

[3] The process for producing a polymerizable composition for optical materials described in [1] or [2], wherein in the step C, the polymerization catalyst (vi) is added so that a content of the polymerization catalyst (vi) in the polymerizable composition for optical materials is 200 to 500 ppm.

[4] The process for producing a polymerizable composition for optical materials described in any one of [1] to [3], wherein the step A includes a step of mixing the polyisocyanate compound (i) with the polymer (ii) and then mixing the obtained mixture with the photochromic compound (iii) and the internal release agent (iv).

[5] The process for producing a polymerizable composition for optical materials described in any one of [1] to [4], wherein a mixing temperature in the step A is 10° C. to 25° C.

[6] The process for producing a polymerizable composition for optical materials described in any one of [1] to [5], wherein the photochromic compound (iii) is a naphthopyran-based compound.

[7] The process for producing a polymerizable composition for optical materials described in any one of [1] to [6], wherein the polyisocyanate compound (i) is at least one compound selected from pentamethylene diisocyanate, hexamethylene diisocyanate, xylylene diisocyanate, bis(isocyanatocyclohexyl)methane, isophorone diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate, and phenylene diisocyanate.

[8] The process for producing a polymerizable composition for optical materials described in any one of [1] to [7], wherein the polymer (ii) is a compound represented by General Formula (iia),

(iia)

wherein, in General Formula (iia), $R_1$ and $R_2$ each represent a hydrogen atom or an alkyl group having 1 to 18 carbon atoms, and at least one of $R_1$ and $R_2$ is a hydrogen atom. A plurality of $R_1$'s are optionally the same or different from each other, and a plurality of $R_2$'s are optionally the same or different from each other. m represents an integer of 15 to 500.

[9] The process for producing a polymerizable composition for optical materials described in any one of [1] to [8], wherein the polythiol compound (v) is at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(2-mercaptoacetate), pentaerythritol tetrakis(3-mercaptopropionate), bis(mercaptoethyl)sulfide, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

[10] A process for producing a plastic lens, including the steps in the manufacturing method described in any one of [1] to [9], and a step of performing cast polymerization on the obtained polymerizable composition for optical materials so as to form a lens substrate.

[11] A polymerizable composition for optical materials, including a polyisocyanate compound (i),
a polymer (ii) represented by General Formula (ii),
a photochromic compound (iii),
an internal release agent (iv),
a polythiol compound (v), and
a polymerization catalyst (vi),
wherein a content of the internal release agent (iv) is 500 to 3,000 ppm, and a content of the polymerization catalyst (vi) is 120 to 500 ppm,

$R_1 + A_1 - R_2 - A_2 - R_3]_n$ (ii)

wherein, n General Formula (ii), $A_1$ and $A_2$ represent different polymer chains. $R_1$ is an n-valent organic group, $R_2$ is a linking group that links two kinds of polymer chains, and $R_3$ is an organic group. n is an integer of 1 to 6.

[12] The polymerizable composition for optical materials described in [11], wherein the internal release agent (iv) includes an acidic phosphoric acid ester.

Advantageous Effects of Invention

From the polymerizable composition for optical materials obtained by the manufacturing method of the present invention, it is possible to obtain an optical material which has excellent transparency and excellent photochromic performance and in which the formation of fine aggregates or the occurrence of optical distortion is suppressed.

DESCRIPTION OF EMBODIMENTS

Hereinafter, the present invention will be described based on embodiments.

According to the present embodiment, a process for producing a polymerizable composition for optical materials includes a step A of mixing together a polyisocyanate compound (i), a polymer (ii) represented by General Formula (ii), a photochromic compound (iii), and an internal release agent (iv), a step B of mixing a mixed solution obtained by the step A with a polythiol compound (v), and a step C of further mixing a mixed solution obtained by the step B with a polymerization catalyst (vi) so as to obtain a polymerizable composition for optical materials.

In the step A, the internal release agent (iv) is added so that the content thereof in the polymerizable composition for optical materials is 500 to 3000 ppm. In the step C, the polymerization catalyst (vi) is added so that the content thereof in the polymerizable composition for optical materials is 120 to 500 ppm.

$$R_1\text{\textemdash}[A_1\text{\textemdash}R_2\text{\textemdash}A_2\text{\textemdash}R_3]_n \qquad (ii)$$

In General Formula (ii), $A_1$ and $A_2$ represent different polymer chains. $R_1$ is an n-valent organic group, $R_2$ is a linking group that links two kinds of polymer chains, and $R_3$ is an organic group. n is an integer of 1 to 6.

<Step A>

In this step, the polyisocyanate compound (i), the polymer (ii) represented by General Formula (ii), the photochromic compound (iii), and the internal release agent (iv) are mixed together.

The internal release agent (iv) is added so that the content thereof in the polymerizable composition for optical materials is 500 to 3,000 ppm, and preferably 500 to 1,000 ppm.

In a case where mixing is performed under the above conditions, it is possible to obtain an optical material which has excellent transparency and excellent photochromic performance and in which the formation of fine aggregates or the occurrence of optical distortion is suppressed.

From the viewpoint of effects of the present invention, the mixing temperature can be 10° C. to 25° C. and preferably 15° C. to 20° C.

The mixing method is not particularly limited, and conventionally known methods can be used for mixing. It is possible to adopt a method of stirring by known means, and the like. It is preferable to appropriately adjust the rotation speed for stirring depending on stirring means or scales to be used. The rotation speed is about 100 to 250 rpm.

In this step, there are no particular limitations on the order of adding the polyisocyanate compound (i), the polymer (ii), the photochromic compound (iii), and the internal release agent (iv) as long as these can be mixed together. These can be added and mixed together at once or can be added in any order and mixed together.

In the present embodiment, from the viewpoint of effects of the present invention, it is preferable that the polyisocyanate compound (i) and the polymer (ii) be mixed together, and then the obtained mixed solution be mixed with the photochromic compound (iii) and the internal release agent (iv). In a case where the polyisocyanate compound (i) and the polymer (ii) are mixed together first, transparency is further improved, and the formation of fine aggregates or the occurrence of optical distortion is further suppressed.

The addition method is not particularly limited. For example, the above components can be added at once, added in divided portions, or added successively. In the present embodiment, each of the components is preferably added at once in the above mixing procedure.

The mixing time is not particularly limited, and can be 2 hours or less, preferably 1.5 hours or less, more preferably 1 hour or less, and particularly preferably 30 minutes or less. The lower limit of the mixing time is not particularly limited, and is 5 minutes or more and preferably 15 minutes or more.

The mixing time is the time after all the components have been added.

Hereinafter, each component will be described.

[Polyisocyanate Compound (i)]

In the present embodiment, the polyisocyanate compound (i) is a compound having 2 or more isocyanato groups. As long as the effects of the present invention can be obtained, various polyisocyanate compounds can be used without particular limitations.

Examples of the polyisocyanate compound (i) in the present embodiment include aliphatic polyisocyanate compounds such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysine diisocyanatomethyl ester, lysine triisocyanate, and xylylene diisocyanate;

alicyclic polyisocyanate compounds such as Isophorone diisocyanate, bis(isocyanatomethyl)cyclohexane, bis(isocyanatocyclohexyl)methane, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl) tricyclodecane and 4,9-bis(isocyanatomethyl) tricyclodecane;

aromatic polyisocyanate compounds such as tolylene diisocyanate, 4,4'-diphenylmethane diisocyanate, diphenylsulfide-4,4-diisocyanate, and phenylene diisocyanate;

heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane; and the like. One polyisocyanate compound can be used alone, or two or more polyisocyanate compounds can be used in combination.

From the viewpoint of effects of the present invention, the polyisocyanate compound (i) in the present embodiment is preferably at least one compound selected from pentamethylene diisocyanate, hexamethylene diisocyanate, xylylene diisocyanate, bis(isocyanatocyclohexyl)methane, isophorone diisocyanate, and 2,5-bis(Isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate, and phenylene diisocyanate.

[Polymer (ii)]

The polymer (ii) of the present embodiment is represented by General Formula (ii).

$$R_1\text{\textemdash}[A_1\text{\textemdash}R_2\text{\textemdash}A_2\text{\textemdash}R_3]_n \qquad (ii)$$

In General Formula (ii), $A_1$ and $A_2$ represent different polymer chains. $R_1$ is an n-valent organic group, $R_2$ is a linking group that links two kinds of polymer chains, and $R_3$ is an organic group. n is an integer of 1 to 6.

Examples of the polymer chain include a polyalkylene chain, a polyester chain, a polysiloxane chain, a polyethyleneimine chain, a polyalkylene oxide chain, and the like. As the polymer chain, a polyalkylene oxide chain is preferable.

Examples of the polyalkylene chain as the polymer chain include a polyethylene chain, a polypropylene chain, a polystyrene chain, a poly (meth) acrylic acid ester chain, a poly (meth) acrylic acid chain, a polymethylene indane chain, and the like.

Examples of the polyester chain as the polymer chain include a poly-α-acetolactone chain, a poly-β-propiolactone chain, a poly-γ-butyrolactone chain, a poly-δ-valerolactone chain, a poly-ε-caprolactone chain, a polylactic acid chain, a polyglycolic acid chain, a polylactic acid-glycolic acid copolymer chain, a polyethylene terephthalate chain, and the like.

Examples of the polysiloxane chain as the polymer chain include a polydimethylsiloxane chain, a polymethylphenylsiloxane chain, and the like.

Examples of the polyethyleneimine chain as the polymer chain include a polyethyleneimine chain, a polypropionyl aziridine chain, a polyacetyl aziridine chain, a polyformyl aziridine chain, and the like.

Examples of the polyalkylene oxide chain as the polymer chain include a polyethylene glycol chain, a polypropylene glycol chain, a polybutylene glycol chain, a polypentene glycol chain, a polyhexene glycol chain, a polyheptene glycol chain, and the like. Furthermore, in a case where n is equal to or greater than 2, the plurality of $A_1$'s and $A_2$'s may each have different polyalkylene oxide chains each other.

$R_1$ is an organic group having a valence of 1 to 6.

Examples of the monovalent organic group include an alkoxy group such as a methoxy group, an ethoxy group, a 1-propanoxy group, a 2-propanoxy group, or a methoxyethoxy group, an alkylthio group such as a methyl mercapto group or an ethyl mercapto group, an acetyl group, and the like.

Examples of the divalent organic group include a difunctional alkoxy group such as an ethylene glycolate group, a propylene glycolate group, or a butylene glycolate group, a difunctional thiolate group such as an ethanedithiolate group or a propanedithiolate group, and the like.

Examples of the trifunctional organic group include a trifunctional alkoxy group such as a glycerolate group, a trioxyethylamine group, or a trioxyethyl (alkyl) ammonium salt.

Examples of the tetrafunctional organic group include a tetravalent amino group such as an ethylenediamino group or an alkylammonium salt thereof, and a tetravalent alkoxy group such as a tetraoxyethylenediamine group or an oxy-compound of pentaerythritol.

Examples of the hexafunctional organic group include an oxy-compound of dipentaerythritol and the like.

$R_2$ is a divalent linking group having 1 to 10 carbon atoms that links two kinds of polymer chains.

Examples of the divalent linking group include an ether-type linking group such as an ethylene glycol group or a propylene glycol group, a biscarboxylate-type linking group such as a Michael adduct of β-mercaptopropionic acid and a (meth) acrylic acid group, an ether carboxylate-type linking group such as a glycolic acid group, and the like. It is possible to use any linking group appropriate for the block copolymer synthesis method.

$R_3$ is a terminal functional group and affects the dispersibility of the polymer (ii). From the viewpoint of maintaining the dispersed state of a nanodomain after the polymerization of the composition, $R_3$ is preferably a polymerizable organic group reactive with the polymerizable functional group of the polyisocyanate compound (i) and the polythiol compound (v).

Examples of such a polymerizable organic group include a hydroxyl group-containing organic group such as a hydroxyethyl group, a hydroxypropyl group, a hydroxybutyl group, or a dihydroxypropyl group; an amino group-containing organic group such as an aminoethyl group or an aminopropyl group; a mercapto group-containing organic group such as a mercaptoethyl group, a mercaptopropionic acid group, a mercaptoethylcarbonyl group, a mercaptopropylcarbonyl group, or a thioglycolic acid group; an epoxy group-containing organic group such as a glycidyl ether group; a thioepoxy group-containing organic group such as a thioglycidyl ether group; a carboxylic acid-containing organic group such as a glycolic acid ether; an organic group having an unsaturated double bond on a terminal such as a vinyl group, an allyl group, an acrylate group or a methacrylate group; an organic group having an unsaturated triple bond on a terminal such as a propargyl group; and the like.

Depending on the type of block copolymer, $R_3$ is optionally unreactive with the above polymerizable functional group in some cases.

Examples of the unreactive organic group include a methoxymethyl group, a methoxyethyl group, a methoxypropyl group, a methoxybutyl group, n ethoxymethyl group, an ethoxyethyl group, an ethoxypropyl group, an ethoxybutyl group, a propioxymethyl group, a propioxyethyl group, a propioxypropyl group, a propioxybutyl group, a butyroxymethyl group, a butyroxyethyl group, a butyroxypropyl group, a butyroxybutyl group, and the like.

Specific examples of the polymer (ii) represented by General Formula (ii) include compounds represented by General Formula (iia), compounds (a) and (b), and the like.

(Compound Represented by General Formula (iia))

In the present embodiment, as the polymer (ii) represented by General Formula (ii), a compound represented by General Formula (iia) can be used.

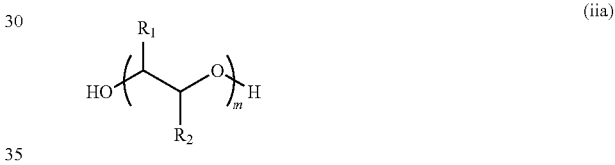

(iia)

In General Formula (iia), $R_1$ and $R_2$ each represent a hydrogen atom or an alkyl group having 1 to 18 carbon atoms, and at least one of $R_1$ and $R_2$ is a hydrogen atom. A plurality of $R_1$'s are optionally the same or different from each other, and a plurality of $R_2$'s are optionally the same or different from each other. m represents an integer of 15 to 500, and preferably represents an integer of 30 to 500.

As the compound represented by General Formula (iia), it is possible to use a compound which has a number-average molecular weight equal to or higher than 150 and preferably has a number-average molecular weight equal to or higher than 200.

As the compound represented by General Formula (iia), specifically, a compound represented by General Formula (iia-1) can be used. Specifically, in a case where General Formula (ii) represents a compound in which $R_1$ is an alkylene (C2-C20) glycolate group, $A_1$ is a polyalkylene (C2-C20) glycol chain, $R_2$ is an oxypropylene group, $A_2$ is a polyethylene glycol chain, $R_3$ is a hydroxyethylene group, and n is 2 that is the valence of the propylene glycolate group, this compound is represented by General Formula (iia-1).

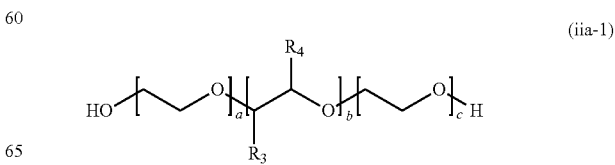

(iia-1)

In General Formula (iia-1), $R_3$ and $R_4$ each represent a hydrogen atom or an alkyl group having 1 to 18 carbon atoms, and at least one of $R_3$ and $R_4$ is a hydrogen atom. a+c is an integer of 2 to 600, and preferably 2 to 400. b represents an integer of 1 to 300, and preferably 1 to 100. A plurality of $R_3$'s and $R_4$'s are optionally the same or different from each other.

Examples of such a compound include the Pluronic series manufactured by BASF SE. The structures of the compounds included in Pluronic are shown in Non-Patent Document 1.

Sometimes the terminal hydroxyl group of the compound represented by General Formula (iia) may react with a polymerizable compound such as the polyisocyanate compound (i).

One compound represented by General Formula (iia) can be used alone, or two or more compounds represented by General Formula (iia) can be used in combination.

(Compounds (a) and (b))

In the present embodiment, compounds (a) and (b) can be used as the polymer (ii) represented by General Formula (ii). As the polymer (ii), one compound selected from the following compounds (a) and (b) can be used alone, or two or more compounds selected from the following compounds (a) and (b) can be used in combination.

(a) Difunctional Block Polyol

In a case where General Formula (ii) represents a compound in which $R_1$ is a propylene glycolate group, $A_1$ is a polypropylene glycol chain, $R_2$ is an oxypropylene group, $A_2$ is a polyethylene glycol chain, $R_3$ is a hydroxyethylene group, and n is 2 that is the valence of the propylene glycolate group, this compound is represented by General Formula (a-1).

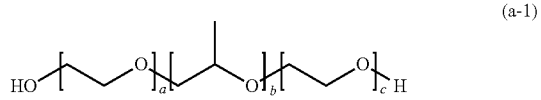

(a-1)

In General Formula (a-1), a, b, and c each represent the number of units. a, b, and c each independently represent an integer of 3 to 300.

Examples of such a compound include the Pluronic series (manufactured by BASF SE), and the like.

In a case where General Formula (ii) represents a similar compound in which $R_1$ is an ethylene glycolate group, $A_1$ is a polyethylene glycol chain, $R_2$ is an oxyethylene group, $A_2$ is a polypropylene glycol chain, $R_3$ is a hydroxypropylene group, and n is 2 that is the valence of the propylene glycolate group, this compound is represented by General Formula (a-2).

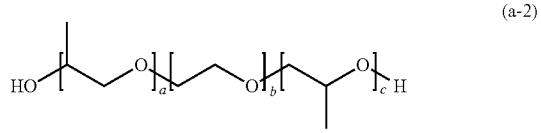

(a-2)

In General Formula (a-2), a, b, and c each represent the number of units. a, b, and c each independently represent an integer of 3 to 300.

Examples of such a compound include the Pluronic R series (manufactured by BASF SE) and the like.

(B) Trifunctional Block Polyol

In a case where General Formula (ii) represents a compound in which $R_1$ is a glycerolate group, $A_1$ is a polypropylene glycol chain, $R_2$ is an oxypropylene group, $A_2$ is a polyethylene glycol chain, $R_3$ is a hydroxyethylene group, and n is 3 that is the valence of the glycerol group, this compound is represented by General Formula (b-1).

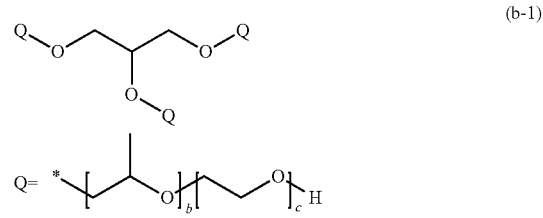

(b-1)

In General Formula (b-1), a, b, and c each represent the number of units. a, b, and c each independently represent an integer of 3 to 300. * represents a bond.

Examples of such a compound include glycerol polypropylene oxide block polyethylene oxide (manufactured by Sigma-Aldrich Co. LLC.) and the like.

The examples also include a compound represented by General Formula (b-2) in which the propylene oxide chain and the ethylene oxide chain in Q in the above formula are switched.

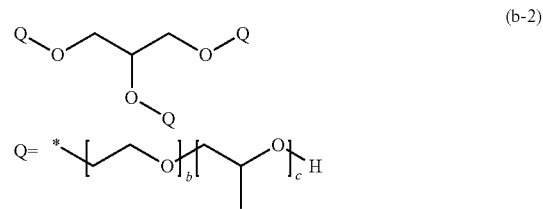

(b-2)

In the present embodiment, one polymer selected from the polymer (ii) represented by General Formula (ii) can be used alone, or two or more polymers selected from the polymer (ii) represented by General Formula (ii) can be used in combination.

In the present embodiment, the content of the polymer (ii) represented by General Formula (ii) with respect to 100 parts by weight of the polymerizable compounds (the polyisocyanate compound (i) and the polythiol compound (v) which will be described later) can be 0.01 to 50 parts by weight, preferably 0.05 to 20 parts by weight, and preferably 0.1 to 10 parts by weight.

[Photochromic Compound (iii)]

The molecular structure of the photochromic compound (iii) reversibly changes by the irradiation with light of a specific wavelength, and the absorption characteristics (absorption spectrum) of the compound change accordingly. Examples of the photochromic compound (iii) used in the present embodiment include compounds whose absorption characteristics (absorption spectrum) change by light of a specific wavelength.

In the present embodiment, the photochromic compound (iii) is not particularly limited. From the conventionally known photochromic compounds that can be used in photochromic lenses, any compound can be appropriately selected and used. For example, it is possible to use one compound or two or more compounds among a spiropyranbased compound, a spirooxazine-based compound, a fulgide-based compound, a naphthopyran-based compound, a bisimidazole compound, and the like, depending on the desired color to be added. In the present embodiment, it is preferable to use a naphthopyran-based compound as the photochromic compound (iii).

In the present embodiment, it is preferable to use at least one photochromic compound selected from General Formula (1) and General Formula (2).

PC-L-Chain (1)

PC-L-Chain-L'-PC' (2)

PC and PC' each represent a monovalent group derived from the compounds represented by General Formulas (3) to (6). PC and PC' are optionally the same or different from each other.

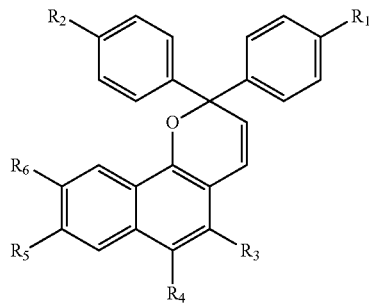
(3)

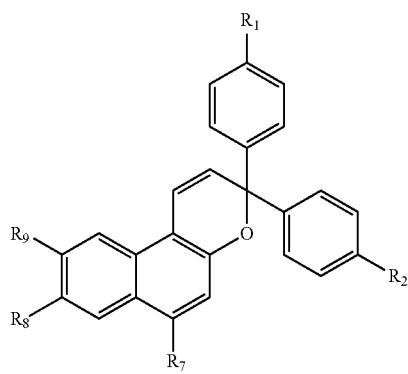
(4)

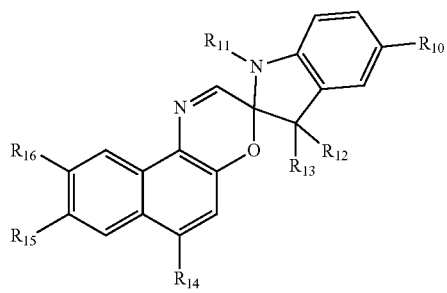
(5)

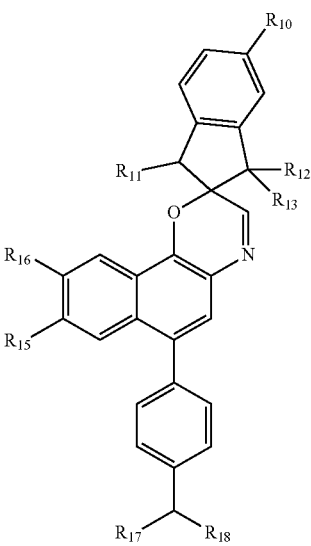
(6)

In Formulas (3) to (6), $R_1$ to $R_{18}$ each represent hydrogen, a halogen atom, a carboxyl group, an acetyl group, a formyl group, a C1-C20 aliphatic group which is optionally substituted, a C3-C20 alicyclic group which is optionally substituted, or a C6-C20 aromatic organic group which is optionally substituted. $R_1$ to $R_{18}$ are optionally the same or different from each other. These aliphatic group, alicyclic group, and aromatic organic group may have an oxygen atom or a nitrogen atom. Any one group contained in the compounds represented by General Formulas (3) to (6) is bonded to L or L' which is a divalent organic group.

Examples of the C1-C20 aliphatic group which are optionally substituted include a linear or branched C1-C10 alkyl group, a linear or branched C1-C10 alkoxy group, a linear or branched C2-C10 alkenyl group, a C1-C10 hydroxyalkyl group, a C1-C10 hydroxyalkoxy group, a C1-C10 alkyl group substituted with a C1-C10 alkoxy group, a C1-C10 alkoxy group substituted with a C1-C10 alkoxy group, a C1-C5 haloalkyl group, a C1-C5 dihaloalkyl group, a C1-C5 trihaloalkyl group, a C1-C10 alkylamino group, a C1-C10 aminoalkyl group, a linear or branched C1-C20 alkoxycarbonyl group, and the like.

Examples of the C3-C20 alicyclic group which are optionally substituted include a C3-C20 cycloalkyl group, a C6-C20 bicycloalkyl group, and the like.

Examples of the C6-C20 aromatic organic group which are optionally substituted include a phenyl group, a C7-C16 alkoxyphenyl group, an arylamino group, a diarylamino group, an aryl C1-C5 alkylamino group, a cyclic amino group, an arylcarbonyl group, and aroyl group, and the like.

As $R_1$ and $R_2$, for example, a hydrogen atom; a halogen atom; a C1-C20 aliphatic group which is optionally substituted, such as a linear or branched C1-C10 alkyl group, a linear or branched C1-C10 alkoxy group, a C1-C10 hydroxyalkoxy group, a C1-C10 alkoxy group substituted with a C1-C10 alkoxy group, a C1-C5 haloalkyl group, a C1-C5 dihaloalkyl group, a C1-C5 trihaloalkyl group, or a C1-C5 alkylamino group; a C6-C20 aromatic organic group which is optionally substituted, such as a phenyl group, a C7-C16 alkoxyphenyl group, a C1-C5 dialkylamino group, an arylamino group, a diarylamino group, an aryl C1-C5 alkylamino group, or a cyclic amino group; and the like are preferable. $R_1$ and $R_2$ are optionally the same or different from each other.

As R₃, for example, a hydrogen atom; a halogen atom; a carboxyl group; an acetyl group; a C1-C20 aliphatic group which is optionally substituted, such as a linear or branched C1-C10 alkyl group, a linear or branched C2-C10 alkenyl group, a linear or branched C1-C10 alkoxy group, a C1-C10hydroxyalkyl group, a C1-C10 alkyl group substituted with a C1-C10 alkoxy group, a C1-C10 aminoalkyl group, or a linear or branched C1-C20 alkoxycarbonyl group; a C3-C20 alicyclic group which is optionally substituted, such as a C3-C20 cycloalkyl group or a C6-C20 bicycloalkyl group; a C6-C20 aromatic organic group which is optionally substituted, such as an arylcarbonyl group, a formyl group, or an aroyl group; and the like are preferable.

As R₄, for example, a hydrogen atom; a halogen atom; a carboxyl group; an acetyl group; a formyl group; a C1-C20 aliphatic group which is optionally substituted, such as a linear or branched C1-C10 alkyl group, a linear or branched C2-C10 alkenyl group, a linear or branched C1-C10 alkoxy group, a C1-C10 hydroxyalkyl group, a C1-C10 alkyl group substituted with a C1-C10 alkoxy group, a C1-C10 aminoalkyl group, or a linear or branched C1-C20 alkoxycarbonyl group; a C3-C20 alicyclic group which is optionally substituted, such as a C3-C20 cycloalkyl group or a C6-C20 bicycloalkyl group; a C6-C20 aromatic organic group which is optionally substituted, such as an arylcarbonyl group, an aroyl group, a phenyl group, a C7-C16 alkoxyphenyl group, a C1-C10 dialkoxyphenyl group, a C1-C10 alkylphenyl group, or a C1-C10 dialkylphenyl group; and the like are preferable.

R₃ and R₄ are optionally bonded to each other. In a case where R₃ and R₄ are bonded to each other to form a ring structure, for example, a structure represented by General Formula (7) or (8) is formed. The portion of the dotted line represents a bond between a carbon atom to which R₃ is bonded and a carbon atom to which R₄ is bonded.

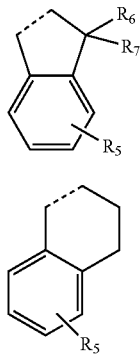

R₅, R₆, R₇, R₈, R₉, R₁₀, R₁₄, R₁₅, and R₁₆ represent the same functional group as R₁ and R₂. A plurality of R₅'s to R₇'s are optionally the same or different from each other.

As R₁₁, for example, a hydrogen atom; a halogen atom; a C1-C20 aliphatic group which is optionally substituted, such as a linear or branched C1-C20 alkyl group, a C1-C5 haloalkyl group, a C1-C5 dihaloalkyl group, or a C1-C5 trihaloalkyl group; a C3-C20 alicyclic group which is optionally substituted, such as a C3-C20 cycloalkyl group, a C6-C20 bicycloalkyl group, a C3-C20 cycloalkyl group substituted with a C1-C5 alkyl group, or a C6-C20 bicycloalkyl group substituted with a C1-C5 alkyl group; a C6-C20 aromatic organic group which is optionally substituted, such as an aryl group substituted with a C1-C5 alkyl group; and the like are preferable.

As R₁₂ and R₁₃, for example, a hydrogen atom; a halogen atom; a C1-C20 aliphatic group which is optionally substituted, such as a C1-C10 alkyl group or a C1-C5 alkylalkoxycarbonyl group; a C3-C20 alicyclic group which is optionally substituted, such as a C5-C7 cycloalkyl group; and the like are preferable.

As R₁₇ and R₁₈, for example, a hydrogen atom; a halogen atom; a C1-C20 aliphatic group which is optionally substituted, such as a linear or branched C1-C10 alkyl group or a C1-C10 hydroxyalkyl group; a C3-C20 alicyclic group which is optionally substituted, such as a C5-C7 cycloalkyl group; and the like are preferable.

L and L' in General Formula (1) or (2) each represent a divalent organic group including at least one group selected from an oxyethylene chain, an oxypropylene chain, a (thio)ester group, and a (thio)amide group.

Specifically, L and L' are represented by General Formulas (9) to (15). L and L' are optionally the same or different from each other.

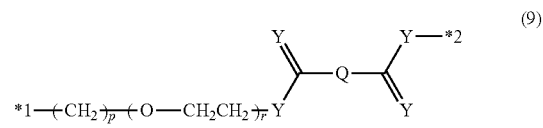

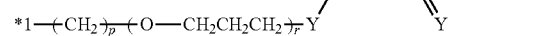

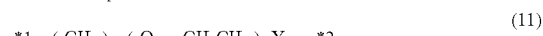

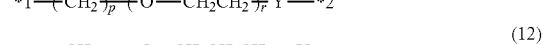

In Formulas (9) to (15),

Y represents oxygen or sulfur.

R₁₉ represents hydrogen or a linear or branched C1-C10 alkyl group.

R₂₀ represents a linear or branched C1-C10 alkyl group.

p represents an integer of 0 to 15, and r represents an integer of 0 to 10.

Q represents a linear or branched C1-C10 alkylene group, a C1-C10 alkenylene group, a divalent group derived from a substituent aryl group at the 1,2-, 1,3-, or 1,4-position, a divalent group derived from a substituent heteroaryl group, and the like.

*1 and *2 each represent a bond. *1 is bonded to a monovalent or divalent organic group represented by "Chain", and *2 is bonded to a monovalent organic group represented by PC or PC'.

"Chain" in General Formula (1) or (2) represents a monovalent or divalent organic group having at least one chain selected from a polysiloxane chain and a polyoxyalkylene chain.

Examples of the polysiloxane chain include a polydimethylsiloxane chain, a polymethylphenylsiloxane chain, a polymethylhydrosiloxane chain, and the like.

Examples of the polyoxyalkylene chain include a polyoxyethylene chain, a polyoxypropylene chain, a polyoxyhexamethylene chain, and the like.

Specifically, in a case where the photochromic compound is represented by General Formula (1), "Chain" represents a monovalent organic group represented by General Formula (16) or (17).

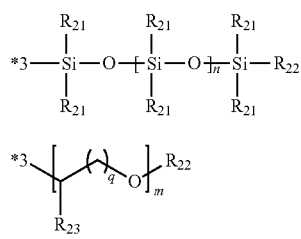

(16)

(17)

In a case where the photochromic compound is represented by General Formula (2), "Chain" represents a divalent organic group represented by General Formula (18) or (19).

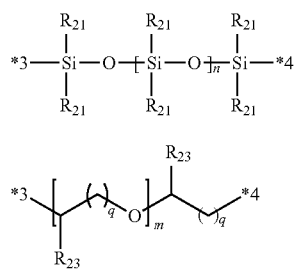

(18)

(19)

In Formulas (16) to (19), $R_{21}$ represents a linear or branched C1-C10 alkyl group.

$R_{22}$ represents a linear or branched C1-C10 alkyl group.

$R_{23}$ represents hydrogen, a methyl group, or an ethyl group.

n represents an integer of 4 to 75, and m represents an integer of 1 to 50.

q represents an integer of 1 to 3.

*3 and *4 each represent a bond. *3 is bonded to a divalent organic group represented by L, and *4 is bonded to a divalent organic group represented by L'.

The photochromic compound (iii) of the present embodiment is obtained by the methods described in WO2009/146509, WO2010/20770, WO2012/149599, and WO2012/162725.

Examples of the photochromic compound (iii) of the present embodiment include Reversacol Humber Blue (polydimethylsiloxane chain, naphthopyran-based chromophore (General Formula 3)), Reversacol Calder Blue (polydimethylsiloxane chain, naphthopyran-based chromophore (General Formula 3)), Reversacol Trent Blue (polydimethylsiloxane chain, naphthopyran-based chromophore (General Formula 3)), Reversacol Pennine Green (polydimethylsiloxane chain, naphthopyran-based chromophore (General Formula 3)), Reversacol Heath Green (polyoxyalkylene chain, naphthopyran-based chromophore (General Formula 3)), Reversacol Chilli Red (polydimethylsiloxane chain, naphthopyran-based chromophore (General Formula 3)), Reversacol Wembley Grey (polyoxyalkylene chain, naphthopyran-based chromophore (General Formula 3)), and Reversacol Cayenne Red (polyoxyalkylene chain, naphthopyran-based chromophore (General Formula 3)) manufactured by Vivimed Labs Limited, and the like. One photochromic compound can be used alone, or two or more photochromic compounds can be used in combination. In the present embodiment, it is preferable to use at least one compound selected from Reversacol Trent Blue, Reversacol Heath Green, Reversacol Chilli Red, Reversacol Wembley Grey, and Reversacol Cayenne Red.

The weight ratio of the photochromic compound (iii) to the polymer (ii) is not particularly limited. The ratio of the weight of the photochromic compound (iii) to 100 parts by weight of the polymer (ii) is preferably 0.01 to 100 parts by weight, and more preferably 1 to 10 parts by weight.

The photochromic compound (iii) can also be added using a premix of the photochromic compound (iii) and the polyisocyanate compound (i). The total amount of the polyisocyanate compound (i) used in the present embodiment includes the amount of the polyisocyanate compound (i) used in the premix.

[Internal Release Agent (iv)]

As the internal release agent (iv), various compounds can be used without particular limitations, as long as the effects of the present invention can be obtained.

In the present embodiment, an acidic phosphoric acid ester can be used as the internal release agent (iv). Examples of the acidic phosphoric acid ester include a phosphoric acid monoester and a phosphoric acid diester. Each of these can be used alone, or two or more of these esters can be used by being mixed together.

The acidic phosphoric acid ester used as the internal release agent (iv) can be represented by General Formula (iv).

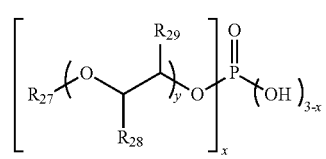

(iv)

In General Formula (iv), x represents an integer of 1 or 2, y represents an integer of 0 to 18, $R_{27}$ represents an alkyl group having 1 to 20 carbon atoms, and $R_{28}$ and $R_{29}$ each independently represent a hydrogen atom, a methyl group, or an ethyl group. The number of carbon atoms in $[\ ]_x$ is preferably 4 to 20. A plurality of $R_{27}$'s, a plurality of $R_{28}$'s, and a plurality of $R_{29}$'s are optionally the same or different from each other.

Examples of $R_{27}$ in General Formula (iv) include organic residues derived from linear aliphatic compounds such as methane, ethane, propane, butane, pentane, hexane, heptane, octane, nonane, decane, undecane, dodecane, tetradecane, and hexadecane, organic residues derived from branched aliphatic compounds such as 2-methylpropane, 2-methylbutane, 2-methylpentane, 3-methylpentane, 3-ethylpentane, 2-methylhexane, 3-methylhexane, 3-ethylhexane, 2-methylheptan, 3-methylheptan, 4-methylheptan, 3-ethylheptan, 4-ethylheptan, 4-propylheptan, 2-methyloctane, 3-methyloctane, 4-methyloctane, 3-ethyloctane, 4-ethyloctane, and 4-propyloctane, organic residues derived from alicyclic compounds such as cyclopentane, cyclohexane, 1,2-dimethylcyclohexane, 1,3-dimethylcyclohexane, and 1,4-dimethylcyclohexane, and the like. At least one compound selected from these can be used. Note that the present invention is not limited to these example compounds. At least one acidic phosphoric acid ester can be used alone, or a mixture of two or more acidic phosphoric acid esters can be used.

In General Formula (iv), y is preferably 0 or 1.

In a case where y is 0, $R_{27}$ is preferably a linear or branched alkyl group having 4 to 12 carbon atoms, and more preferably a linear alkyl group having 4 to 12 carbon atoms.

In a case where y is 1, $R_{27}$ is preferably a linear or branched alkyl group having 1 to 20 carbon atoms, and preferably a linear or branched alkyl group having 3 to 12 carbon atoms.

One acidic phosphoric acid ester selected from these can be used alone, or a mixture of two or more acidic phosphoric acid esters selected from these can be used.

As the acidic phosphoric acid ester, Zelec UN (manufactured by STEPAN Company), an internal release agent for MR (manufactured by Mitsui Chemicals, Inc.), JP series manufactured by JOHOKU CHEMICAL CO., LTD, PHOSPHANOL series manufactured by TOHO Chemical Industry Co., Ltd., AP and DP series manufactured by DAIHACHI CHEMICAL INDUSTRY CO., LTD., and the like can be used. Among these, Zelec UN (manufactured by STEPAN Company), an internal release agent for MR (manufactured by Mitsui Chemicals, Inc.), and JP series manufactured by JOHOKU CHEMICAL CO., LTD are more preferable.

[Other Components]

In this step, in order that the optical material of the present embodiment does not deteriorate even being exposed to the outside for a long period time, an ultraviolet absorber and a hindered amine-based light stabilizer can be further added.

The ultraviolet absorber is not particularly limited. For example, it is possible to use various ultraviolet absorbers such as a benzotriazole-based ultraviolet absorber, a triazine-based ultraviolet absorber, a benzophenone-based ultraviolet absorber, a benzoate-based ultraviolet absorber, a propanedioic acid ester-based ultraviolet absorber, and an oxanilide-based ultraviolet absorber.

In this step, as will be described later, in addition to the photochromic compound (iii), a substance to be encapsulated in a microphase-separated structure composed of the polymer (ii) can be added. Examples of such a substance include metal particles and the like.

In the composition, the microphase-separated structure can also act as a dispersant for substances that are easily aggregated.

In this step, if necessary, various additives such as an infrared absorber, a radical scavenger, an antioxidant, a polymerization inhibitor, non-light controlling dyes and pigments, a binder, a dispersant, an antifoaming agent, a leveling agent, and organic or inorganic nanometer-sized particles may also be added.

<Step B>

In the step B, a mixed solution obtained by the step A is further mixed with the polythiol compound (v).

In this step, the method of adding the polythiol compound (v) is not particularly limited as long as the compound can be mixed in. For example, the polythiol compound (v) can be added at once, added in divided portions, or added successively. The mixing method is not particularly limited, and conventionally known methods can be used for mixing. It is possible to adopt a method of stirring by known means, and the like.

In this step, the temperature during mixing is optionally the same or different from the mixing temperature in the Step A, and is appropriately selected in a range of 10° C. to 25° C. The stirring time is not particularly limited as long as the polythiol compound (v) can be mixed in. Usually, stirring time is within 1 hour.

[Polythiol Compound (v)]

In the present embodiment, the polythiol compound (v) is a compound having 2 or more mercapto groups. As long as the effects of the present invention can be obtained, various polythiol compounds can be used without particular limitations.

Examples of the polythiol compound (v) in the present embodiment include aliphatic polythiol compounds such as methanedithiol, 1,2-ethanedithiol, 1,2,3-propanetrithiol, 1,2-cyclohexanedithiol, bis(2-mercaptoethyl)ether, tetrakis (mercaptomethyl)methane, diethylene glycol bis(2-mercaptoacetate), diethylene glycol bis(3-mercaptopropionate), ethylene glycol bis (2-mercaptoacetate), ethylene glycol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), bis(mercaptomethyl)sulfide, bis(mercaptomethyl)disulfide, bis(mercaptoethyl)sulfide, bis(mercaptoethyl)disulfide, bis(mercaptopropyl)sulfide, bis (mercaptomethylthio)methane, bis(2-mercaptoethylthio) methane, bis(3-mercaptopropylthio)methane, 1,2-bis (mercaptomethylthio)ethane, 1,2-bis(2-mercaptoethylthio) ethane, 1,2-bis(3-mercaptopropylthio)ethane, 1,2,3-tris (mercaptomethylthio)propane, 1,2,3-tris (2-mercaptoethylthio)propane, 1,2,3-tris (3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, thioglycolic acid and mercaptopropionic acid esters of these, hydroxymethylsulfide bis(2-mercaptoacetate), hydroxymethylsulfide bis(3-mercaptopropionate), hydroxyethylsulfide bis(2-mercaptoacetate), hydroxyethylsulfide bis(3-mercaptopropionate), hydroxymethyldisulfide bis(2-mercaptoacetate), hydroxymethyldisulfide bis(3-mercaptopropionate), hydroxyethyldisulfide bis(2-mercaptoacetate), hydroxyethyldisulfide bis(3-mercaptopropinate), 2-mercaptoethyl ether bis(2-mercaptoacetate), 2-mercaptoethyl ether bis(3-mercaptopropionate), thiodiglycolic acid bis(2-mercaptoethyl ester), thiodipropionic acid bis(2-mercaptoethyl ester), dithiodiglycolic acid bis(2-mercaptoethyl ester), dithiodipropionic acid bis(2-mercaptoethyl ester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris(mercaptoethylthio)methane; aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl)benzene, 1,4-bis(mercaptomethyl)benzene, 1,2-bis(mercaptoethyl)benzene, 1,3-bis(mercaptoethyl)benzene, 1,4-bis(mercaptoethyl)benzene, 1,3,5-trimercaptobenzene, 1,3,5-tris(mercaptomethyl)benzene, 1,3,5-tris(mercaptomethyleneoxy)benzene, 1,3,5-tris(mercaptoethyleneoxy)benzene, 2,5-toluenedithiol, 3,4-toluenedithiol, 1,5-naphthalenedithiol, and 2,6-naphthalenedithiol; heterocyclic polythiol compounds such as 2-methylamino-4,6-dithiol-sym-triazine, 3,4-thiophenedithiol, bismuthiol, 4,6-bis(mercaptomethylthio)-1,3-dithiane, and 2-(2,2-bis(mercaptomethylthio)ethyl)-1,3-dithietane; and the like. Each of these compounds can be used alone, or two or more of these compounds can be used in combination.

From the viewpoint of effects of the present invention, the polythiol compound (v) of the present embodiment is preferably at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(2-mercaptoacetate), pentaerythritol tetrakis(3-mercaptopropionate), bis(mercaptoethyl)sulfide, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

The ratio of the polythiol compound (v) and the polyisocyanate compound (i) used is not particularly limited. Generally, a molar ratio of SH group/NCO group is in a range of 0.5 to 3.0, preferably in a range of 0.6 to 2.0, and more preferably in a range of 0.8 to 1.3. In a case where the ratio of the compounds used is within the above range, various performances such as refractive index and heat resistance required for optical materials such as plastic lenses and transparent materials can be satisfied in a well-balanced manner.

[Other Components]

In this step, a bluing agent or the like can be added in addition to the polythiol compound (v).

<Step C>

In the step C, a mixed solution obtained by the step B is further mixed with the polymerization catalyst (vi).

The polymerization catalyst (vi) is added such that the content thereof in the polymerizable composition for optical materials is 120 to 500 ppm, preferably 150 to 500 ppm, more preferably 200 to 500 ppm, even more preferably 200 to 400 ppm, and particularly preferably 200 to 300 ppm.

In a case where mixing is performed under the above conditions, it is possible to obtain an optical material which has excellent transparency and excellent photochromic performance and in which the formation of fine aggregates or the occurrence of optical distortion is suppressed.

The method of mixing in the polymerization catalyst (vi) is not particularly limited, and conventionally known methods can be used for mixing. It is possible to adopt a method of stirring by known means, and the like. The polymerization catalyst (vi) is preferably added using a premix of the polymerization catalyst (vi) and the polyisocyanate compound (i). The total amount of the polyisocyanate compound (i) used in the present embodiment includes the amount of the polyisocyanate compound (i) used in the premix.

In this step, the temperature during mixing is optionally the same or different from the mixing temperature in the Step A, and is appropriately selected in a range of 10° C. to 25° C. The stirring time is not particularly limited as long as the polymerization catalyst (vi) can be mixed in. Usually, the stirring time is within 1 hour.

[Polymerization Catalyst (vi)]

As the polymerization catalyst (vi), various compounds can be used without particular limitations, as long as the effects of the present invention can be obtained.

In the present embodiment, examples of the polymerization catalyst (vi) include a Lewis acid, amine, a tertiary amine compound and inorganic and organic acid salts thereof, a metal compound, a quaternary ammonium salt, an organic sulfonic acid, and the like.

Examples of the metal compound used as the polymerization catalyst (vi) include dimethyl tin dichloride, dibutyl tin dichloride, dibutyl tin dilaurate, and the like.

The polymerization catalyst (vi) is preferably added using a premix of the polymerization catalyst (vi) and the polyisocyanate compound (i). The total amount of the polyisocyanate compound (i) used in the present embodiment includes the amount of the polyisocyanate compound (i) used in the premix.

If necessary, vacuum degassing can be performed on the polymerizable composition for optical materials of the present embodiment obtained by the above steps.

The polymerizable composition for optical materials of the present embodiment contains
a polyisocyanate compound (i),
a polymer (ii) represented by General Formula (ii),
a photochromic compound (iii),
an internal release agent (iv),
a polythiol compound (v), and
a polymerization catalyst (vi).

In the polymerizable composition for optical materials of the present embodiment, the content of the internal release agent (iv) is 500 to 3000 ppm and preferably 500 to 1,000 ppm, and the content of the polymerization catalyst (vi) is 120 to 500 ppm, preferably 150 to 500 ppm, more preferably 200 to 500 ppm, even more preferably 200 to 400 ppm, and particularly preferably 200 to 300 ppm.

The polymerizable composition for optical materials of the present embodiment can provide an optical material which has excellent transparency and excellent photochromic performance and in which the formation of fine aggregates or the occurrence of optical distortion is suppressed.

<Molded Article and Uses Thereof>

In the present embodiment, by varying the shape of molds used in polymerizing the aforementioned polymerizable composition for optical materials, it is possible to obtain molded articles in various shapes and optical materials formed of the molded articles. The molded article of the present embodiment that is shaped as desired and provided with a coat layer, other members, and the like formed as needed can be used as various optical materials.

The cured product of the present embodiment contains, as main components, a microphase-separated structure formed of the polymer (ii), the photochromic compound (iii), and a thiourethane resin obtained by polymerizing the polyisocyanate compound (i) and the polythiol compound (v). Examples of the microphase-separated structure include polymer particles (micellar particles) having a microphase-separated structure composed of the polymer (ii). The molded article including the microphase-separated structure can provide an optical material excellent in photochromic properties, heat resistance, and mechanical properties.

At least apart of the photochromic compound (iii) is optionally encapsulated in the microphase-separated structure composed of the polymer (ii). In this case, the optical material is particularly excellent in photochromic characteristics and mechanical properties.

The 50% volume-based average particle size of the polymer particles, which are a microphase-separated structure, is 1 nm to 1,000 nm. This structure can be confirmed using a transmission electron microscope.

(Microphase-Separated Structure)

The microphase-separated structure will be described below. A block copolymer is a polymer consisting of a plurality of different copolymer moieties connected to each other through covalent bonds. These copolymer moieties have different physical properties and affinities. For example, in an amphipathic block copolymer, the copolymer moieties tend to separate from each other due to strong repulsive force and are not intermixed just as water and oil, which leads to phase separation. However, because the copolymer moieties are chemically bonded to each other, complete macroscopic phase separation found in a simple mixture of two homopolymers does not occur. On the other hand, in the microphase separation of a block copolymer consisting of different copolymer moieties A and B, a microaggregate of a moiety rich in the copolymer A and a moiety rich in the copolymer B is formed. As a result, depending on the structure of block copolymer, several morphologies such as nano-sized spherical polymer micelles can be observed. Details of the microphase separation of such a block copolymer are described, for example, in a reference (Chem. Soc. Rev., 2012, 41, 5969-5985). By having a microphase separated structure such as polymer particles including a microphase separated structure, the obtained molded article can have transparency with less turbidity.

Examples of the optical material include a plastic lens, a light emitting diode (LED), a prism, optical fiber, an information recording substrate, a filter, and the like. Particularly, the optical material is suitable as a plastic lens.

Hereinafter, a plastic lens formed of the molded article of the present embodiment will be described. The plastic lens can be manufactured as follows.

<Method for Manufacturing Plastic Lens>

The method for manufacturing plastic lens of the present embodiment includes a step of preparing the polymerizable composition for optical materials described above, and a step of performing cast polymerization on the obtained polymerizable composition for optical materials so as to form a lens substrate.

In the step of forming the lens substrate, the obtained composition of the present embodiment is injected into a cavity consisting of a cavity mold and a gasket or tape and heated so that the composition is polymerized and cured. In this way, a plastic lens substrate formed of a resin is manufactured. By this step, the polymerizable compounds (the polyisocyanate compound (i) and the polythiol compound (v)) are polymerized and form a resin, and the polymer (ii) forms a microphase-separated structure. Therefore, a lens substrate formed of the resin, the microphase-separated structure, and the photochromic compound (iii) can be obtained.

In a case where the lens substrate is manufactured by heating, in order to prevent uneven polymerization (striae) resulting from convection, generally, polymerization is carried out by slowly raising the heating temperature from low temperature.

The polymerization conditions are not limited because they greatly vary with the type and used amount of the polymerizable composition for optical materials and the catalyst, the mold shape, and the like. Generally, the polymerization is performed for 1 to 50 hours at −50° C. to 150° C. In some cases, it is preferable to cure the composition for 1 to 25 hours at a temperature that is fixed or slowly raised within a range of 10° C. to 150° C.

If necessary, after being released from the mold, the obtained plastic lens substrate is optionally subjected to a re-heating treatment (annealing) so as to complete the polymerization or remove strain caused by residual stress.

The surface of the plastic lens substrate formed of a resin obtained as above is optionally provided with functional coat layers such a hardcoat, an antireflection coat, a light controlling coat, a lubricating coat or a lubricating treatment, and an antistatic coat. Furthermore, for the surface of the plastic lens substrate, a coloring treatment for fashion, a surface or edge polishing treatment, and the like are optionally performed. In addition, a polarizing film is optionally put into the lens substrate or attached to the surface of the lens substrate so that the polarizing properties are added, and various types of processing for adding functions may also be performed.

Furthermore, for the purpose of improving the adhesion between the functional coat layer and the substrate and the like, the obtained cured resin of the present embodiment and the surface of a plastic lens formed of the resin can be subjected to physical or chemical treatments such as a corona treatment, an ozone treatment, a low temperature plasma treatment using oxygen gas, nitrogen gas, or the like, a glow discharge treatment, an oxidation treatment using chemicals or the like, and a flame treatment.

Instead of or in addition to the above treatments, a primer treatment, an undercoat treatment, an anchor coat treatment, or the like is optionally performed so that a primer layer is placed between the surface of the cured resin of the present embodiment plus the plastic lens formed of the resin and the outermost layer (surface contacting the atmosphere) formed by the physical or chemical treatments described above.

The cured resin of the present embodiment is optionally used for other uses in addition to plastic lenses. Examples of uses other than plastic lenses include sheet and film manufactured in the same manner as plastic lenses by using a flat mold, and the like. The surface of the sheet and film made of the cured resin of the present embodiment is optionally physically or chemically treated just as the plastic lens. Furthermore, the aforementioned primer layer and the outermost functional layer (surface contacting the atmosphere) formed by the physical or chemical treatment or the like is optionally laminated on the sheets and films.

The plastic lens formed of the cured resin of the present embodiment is optionally a laminate including a primer layer between the functional outermost layer (surface contacting the atmosphere) formed by the aforementioned physical or chemical treatment or the like and the surface of the cured resin.

The plastic lens of the present embodiment obtained as above can be used as various lenses such as a spectacle lens, a camera lens, a pickup lens, a Fresnel lens, a prism lens, and a lenticular lens. The plastic lens is particularly preferably used as a spectacle lens, a camera lens, and a pickup lens having a smooth surface, among the above.

The sheets or films of the present embodiment obtained in the same manner as above can be used as various flat members required to have high transparency, for example, a display member such as a flat panel or a smartphone panel, a film member such as a shatterproof film, a film cutting a specific wavelength, or a decorative film, a glass substitute member such as vehicle window glass or a mirror, and the like.

EXAMPLE

Hereinafter, the present invention will be more specifically described with reference to examples, but the present invention is not limited thereto. Molded articles formed of a cured resin were evaluated by the following method.

Transparency: a devitrification level was adopted as an analysis item for evaluating the transparency of a molded article. The devitrification level was obtained by the following procedure. A circular flat plate having a thickness of 9 mm and a diameter Φ of 75 mm was irradiated with a light source (Luminar Ace LA-150A manufactured by HAYASHI) and measured using a greyscale imaging device. The captured image was digitized by greyscale image processing, thereby obtaining a devitrification level. Transparency was evaluated according to the following criteria.

A: The devitrification level is equal to or lower than 100, and transparency is excellent.

B: The devitrification level is higher than 100, and transparency is poor.

Fine aggregates (granular defects present on the inside of lens that are confirmed using a light source): The lens was visually observed so as to evaluate whether or not fine aggregates exist.

Striae: The lens was illuminated with an ultra-high pressure mercury lamp (light source model OPM-252HEG: manufactured by Ushio Inc.), and the projected image was visually observed to evaluate whether or not striae exist.

Example 1

Reversacol Wembley Grey (0.035 parts by weight), 0.058 parts by weight of Reversacol Heath Green, 0.029 parts by weight of Peacock Blue, and 0.023 parts by weight of Jalapeno Red as photochromic compounds manufactured by Vivimed Labs Limited and 0.073 parts by weight of HOSTAVIN PR-25 as an ultraviolet absorber were dissolved in advance in 9.8 parts by weight of a composition containing 2,5-bis(isocyanatomethyl)bicyclo-[2.2.1]-heptane and 2,6-bis(isocyanatomethyl)bicyclo-[2.2.1]-heptane in advance, thereby preparing a master solution. The obtained master solution (10 parts by weight) was added to 30.25 parts by weight of a composition containing 2,5-bis (isocyanatomethyl)bicyclo-[2.2.1]-heptane and 2,6-bis(isocyanatomethyl)bicyclo-[2.2.1]-heptane, followed by stirring. ADEKA PLURONIC L-64 (2.52 parts by weight) manufactured by ADEKA Corporation and 0.1 parts by weight of JP-506H as an acidic phophoric acid ester manufactured by JOHOKU CHEMICAL CO., LTD were added to the obtained mixed solution, and the obtained mixed solution was stirred for 30 minutes at a temperature of 15° C. to 20° C. (mixing step A).

Pentaerythritol tetrakis(3-mercaptopropionate) (19.98 parts by weight) and 27.25 parts by weight of 4-mercaptomethyl-1,8-dimercapto-3,6-dithiaoctane were added to the mixed solution obtained by the mixing step A, and the mixed solution was stirred for 15 minutes at a temperature of 15° C. to 20° C. (mixing step B).

Dimethyltindichloride (0.02 parts by weight) was added in advance to 10 parts by weight of a composition containing 2,5-bis(isocyanatomethyl)bicyclo-[2.2.1]-heptane and 2,6-bis(isocyanatomethyl)bicyclo-[2.2.1]-heptane and uniformly dissolved, thereby preparing a solution. This solution was added to the mixed solution obtained by the mixing step B and stirred for 15 minutes at a temperature of 15° C. to 20° C., thereby obtaining a polymerizable composition (mixing step C).

Thereafter, the polymerizable composition was stirred and degassed for 1 hour at a temperature of 15° C. to 20° C. in an environment with a reduced pressure equal to or lower than 400 Pa, then filtered through a 1.0 μm PTFE filter, and cast into a glass mold. The polymerizable composition was polymerized for 48 hours in a range of 10° C. to 130° C., then the mold was taken out of the furnace and removed, and a molded article obtained by the polymerization was taken out.

The molded article was colorless and transparent and had excellent light control performance in which the molded article develops color as soon as being exposed to solar rays and is decolored when the light rays are blocked. Furthermore, no fine aggregates or striae were found in the molded article. Table 1 shows the evaluation results of the obtained molded article.

Examples 2 to 6

Polymerizable compositions and molded articles were prepared in the same manner as in Example 1, except that the stirring time and the type and amount of the release agent added in the step A as well as the amount of the polymerization catalyst added in the step C were appropriately changed as shown in Table 1.

The molded articles were colorless and transparent and had excellent light control performance in which the molded articles develop color as soon as being exposed to solar rays and are decolored when the light rays are blocked. Furthermore, no fine aggregates or striae were found in the molded articles. Table 1 shows the evaluation results of the obtained molded articles.

Comparative Examples 1 to 6

Polymerizable compositions and molded articles were prepared in the same manner as in Example 1, except that the stirring time and the amount of the release agent added in the step A, the amount of the polymerization catalyst added in the step C, and the step of adding the polymer (ii) (ADEKA PLURONIC L-64 manufactured by ADEKA Corporation) were appropriately changed as shown in Table 1.

The molded articles had excellent light control performance in which the molded articles develop color as soon as being exposed to solar rays and are decolored when the light rays are blocked. However, the molded articles had poor transparency and confirmed to have fine aggregates and striae. Table-1 shows the evaluation results of the obtained molded articles.

TABLE-1

| | Stirring time [H] | Type Of release agent | Amount of release agent [ppm] | Amount of catalyst [ppm] | Step of adding polymer (ii) | Lens transparency | Fine aggregates | Striae |
|---|---|---|---|---|---|---|---|---|
| | Step A | | | Step C | | | | |
| Example 1 | 0.5 | Release agent 1 | 1,000 | 200 | A | A | Absent | Absent |
| Example 2 | 0.5 | Release agent 1 | 3,000 | 400 | A | A | Absent | Absent |
| Example 3 | 2 | Release agent 1 | 3,000 | 400 | A | A | Absent | Absent |
| Example 4 | 2 | Release agent 1 | 3,000 | 500 | A | A | Absent | Absent |
| Example 5 | 2 | Release agent 1 | 500 | 200 | A | A | Absent | Absent |
| Example 6 | 0.5 | Release agent 2 | 1,000 | 200 | A | A | Absent | Absent |
| Comparative Example 1 | 0.5 | Release agent 1 | 3,000 | 400 | B | B | Present | Present |
| Comparative Example 2 | 0.5 | Release agent 1 | 3,000 | 400 | C | B | Present | Present |
| Comparative Example 3 | 0.5 | Release agent 1 | 5,000 | 400 | A | B | Present | Present |
| Comparative Example 4 | 0.5 | Release agent 1 | 100 | 400 | A | B | Present | Present |
| Comparative Example 5 | 0.5 | Release agent 1 | 3,000 | 100 | A | B | Present | Absent |
| Comparative Example 6 | 0.5 | Release agent 1 | 3,000 | 600 | A | A | Present | Present |

Release agent 1: JP-506H manufactured by JOHOKU CHEMICAL CO., LTD
Release agent 2: ZelecUN manufactured by Stepan This application claims a priority based on Japanese Patent Application No. 2019-013922 filed on Jan. 30, 2019, the entire content of which is incorporated into the present specification.

The invention claimed is:

1. A process for producing a polymerizable composition for optical materials, comprising:
   a step A of mixing together an alicyclic polyisocyanate compound (i), a polymer (ii) represented by General Formula (ii), a photochromic compound (iii), and an internal release agent (iv);
   a step B of mixing a mixed solution obtained by the step A with a polythiol compound (v); and
   a step C of further mixing a mixed solution obtained by the step B with a polymerization catalyst (vi) so as to obtain a polymerizable composition for optical materials,
   wherein in the step A, the internal release agent (iv) is added so that a content of the internal release agent (iv) in the polymerizable composition for optical materials is 500 to 1,000 ppm, and
   in the step C, the polymerization catalyst (vi) is added so that a content of the polymerization catalyst (vi) in the polymerizable composition for optical materials is 120 to 400 ppm, $$R_1 \text{-}[\text{-}A_1\text{-}R_2\text{-}A_2\text{-}R_3]_n \text{(ii)}$$

wherein, in General Formula (ii), $A_1$ and $A_2$ represent different polymer chains, $R_1$ is an n-valent organic group, $R_2$ is a linking group that links two kinds of polymer chains, $R_3$ is an organic group, and n is an integer of 1 to 6.

2. The process for producing a polymerizable composition for optical materials according to claim 1,
   wherein in the step A, a time taken for mixing together the polyisocyanate compound (i), the polymer (ii), the photochromic compound (iii), and the internal release agent (iv) is 2 hours or less.

3. The process for producing a polymerizable composition for optical materials according to claim 1,
   wherein in the step C, the polymerization catalyst (vi) is added so that a content of the polymerization catalyst (vi) in the polymerizable composition for optical materials is 200 to 500 ppm.

4. The process for producing a polymerizable composition for optical materials according to claim 1,
   wherein the step A includes a step of mixing the polyisocyanate compound (i) with the polymer (ii) and then mixing the obtained mixture with the photochromic compound (iii) and the internal release agent (iv).

5. The process for producing a polymerizable composition for optical materials according to claim 1,
   wherein a mixing temperature in the step A is 10° C. to 25° C.

6. The process for producing a polymerizable composition for optical materials according to claim 1,
   wherein the photochromic compound (iii) is a naphthopyran-based compound.

7. The process for producing a polymerizable composition for optical materials according to claim 1,
   wherein the polyisocyanate compound (i) is at least one compound selected from pentamethylene diisocyanate, hexamethylene diisocyanate, xylylene diisocyanate, bis (isocyanatocyclohexyl)methane, isophorone diisocyanate, 2,5-bis(isocyanatomethyl)bicyclo-[2.2.1]-heptane, 2,6-bis(isocyanatomethyl)bicyclo-[2.2.1]-heptane, tolylene diisocyanate, 4,4'-diphenylmethane diisocyanate, and phenylene diisocyanate.

8. The process for producing a polymerizable composition for optical materials according to claim 1,
wherein the polymer (ii) is a compound represented by General Formula (iia),

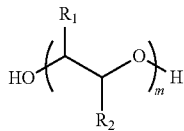 (iia)

wherein, in General Formula (iia), $R_1$ and $R_2$ each represent a hydrogen atom or an alkyl group having 1 to 18 carbon atoms, at least one of $R_1$ and $R_2$ is a hydrogen atom, a plurality of $R_1$'s are optionally the same or different from each other, a plurality of $R_2$'s are optionally the same or different from each other, and m represents an integer of 15 to 500.

9. The process for producing a polymerizable composition for optical materials according to claim 1,
wherein the polythiol compound (v) is at least one compound selected from 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(2-mercaptoacetate), pentaerythritol tetrakis(3-mercaptopropionate), bis(mercaptoethyl)sulfide, 2,5-dimercaptomethyl-1,4-dithiane, 1,1,3,3-tetrakis(mercaptomethylthio)propane, 4,6-bis(mercaptomethylthio)-1,3-dithiane, and 2-(2,2-bis(mercaptomethylthio)ethyl)-1,3-dithietane.

10. A process for producing a plastic lens, comprising:
the steps in the manufacturing method according to claim 1; and
a step of performing cast polymerization on the obtained polymerizable composition for optical materials so as to form a lens substrate.

11. A polymerizable composition for optical materials, comprising:

a polyisocyanate compound (i);
a polymer (ii) represented by General Formula (ii);
a photochromic compound (iii);
an internal release agent (iv);
a polythiol compound (v); and
a polymerization catalyst (vi),
wherein a content of the internal release agent (iv) is 500 to 1,000 ppm, and
a content of the polymerization catalyst (vi) is 120 to 400 ppm,

 (ii)

wherein, in General Formula (ii), $A_1$ and $A_2$ represent different polymer chains, $R_1$ is an n-valent organic group, $R_2$ is a linking group that links two kinds of polymer chains, $R_3$ is an organic group, and n is an integer of 1 to 6.

12. The polymerizable composition for optical materials according to claim 11,
wherein the internal release agent (iv) includes an acidic phosphoric acid ester.

13. A process for producing a polymerizable composition for optical materials, comprising:
a step A of mixing together a polyisocyanate compound (i), a polymer (ii) represented by General Formula (ii), a photochromic compound (iii), and an internal release agent (iv);
a step B of mixing a mixed solution obtained by the step A with a polythiol compound (v); and
a step C of further mixing a mixed solution obtained by the step B with a polymerization catalyst (vi) so as to obtain a polymerizable composition for optical materials, wherein the polyisocyanate compound (i) contains at least one selected from the group consisting of an aliphatic polyisocyanate compound, an aromatic polyisocyanate compound, and a heterocyclic polyisocyanate compound, wherein in the step A, the internal release agent (iv) is added so that a content of the internal release agent (iv) in the polymerizable composition for optical materials is 500 to 1,000 ppm, and in the step C, the polymerization catalyst (vi) is added so that a content of the polymerization catalyst (vi) in the polymerizable composition for optical materials is 120 to 400 ppm,

 (ii)

wherein, in General Formula (ii), $A_1$ and $A_2$ represent different polymer chains, $R_1$ is an n-valent organic group, $R_2$ is a linking group that links two kinds of polymer chains, $R_3$ is an organic group, and n is an integer of 1 to 6.

* * * * *